US007911645B2

(12) United States Patent
Sagimori

(10) Patent No.: US 7,911,645 B2
(45) Date of Patent: Mar. 22, 2011

(54) APPARATUS AND METHOD FOR ADJUSTING DENSITY IN IMAGE FORMING

(75) Inventor: Yuuki Sagimori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 778 days.

(21) Appl. No.: 11/898,434

(22) Filed: Sep. 12, 2007

(65) Prior Publication Data

US 2008/0123121 A1 May 29, 2008

(30) Foreign Application Priority Data

Nov. 27, 2006 (JP) ................................ 2006-318200

(51) Int. Cl.
*H04N 1/40* (2006.01)

(52) U.S. Cl. .......................... 358/1.9; 358/504; 358/406

(58) Field of Classification Search ................... 358/1.9, 358/2.1, 504, 406, 500, 515–519, 527
See application file for complete search history.

(56) References Cited

U.S. PATENT DOCUMENTS 5,539,523 A * 7/1996 Nakai et al. .................. 358/296

FOREIGN PATENT DOCUMENTS

| | | |
|---|---|---|
| JP | 61-160771 | 7/1986 |
| JP | 2005286625 A | * 10/2005 |
| JP | 2006-79001 | 3/2006 |

* cited by examiner

*Primary Examiner* — Thomas D Lee
*Assistant Examiner* — Stephen M Brinich
(74) *Attorney, Agent, or Firm* — Dickstein Shapiro LLP

(57) ABSTRACT

In order to adjust density of a colorant of an image forming apparatus, a plurality of adjustment condition data sets is provided. An image forming engine of the image forming apparatus forms a test pattern image of a test pattern using the colorant. A detector of the image forming apparatus detects a density level of the colorant from the test pattern image to output a detected density. A controller of the image forming apparatus selects one of the plurality of adjustment condition data sets as a selected adjustment condition data set, and performs density adjustment according to the selected adjustment condition data set.

13 Claims, 11 Drawing Sheets

FIG. 3A

60

| ADJUSTMENT TIME | ADJUSTMENT PERFORMED |
|---|---|
| POWERED ON | On / Off |
| TONER REPLACED | On / Off |
| NO. OF PRINTED PAGES | 300 /500 /1000 /Off |
| WAITING TIME | 3h/6h/12h/Off |
| USER REQUEST | — |

FIG. 3B

62

| ADJUSTMENT MODE | ACCEPTABLE RANGE |
|---|---|
| HIGH SPEED/ LOW QUALITY | ±20% |
| NORMAL SPEED/ NORMAL QUALITY | ±10% |
| LOW SPEED/ HIGH QUALITY | ±5% |

FIG. 3C

64

| ADJUSTMENT MODE | NO. OF LEVELS |
|---|---|
| HIGH SPEED/ LOW QUALITY | 5 |
| NORMAL SPEED/ NORMAL QUALITY | 7 |
| LOW SPEED/ HIGH QUALITY | 11 |

FIG. 3D

65

| ADJUSTMENT MODE | NO. OF ADJUSTMENT |
|---|---|
| HIGH SPEED/ LOW QUALITY | 1 |
| NORMAL SPEED/ NORMAL QUALITY | 2 |
| LOW SPEED/ HIGH QUALITY | 3 |

FIG. 3E

66

| TEST PATTERN | COLOR SEPARATION METHOD |
|---|---|
| CMYK | CMYK<br>CMY, K<br>C, M, Y, K |

FIG. 3F

68

| COLOR FOR ADJUSTMENT | ALL SAMPLE ADJUSTMENT |
|---|---|
| CMYK | On / Off |
| CMY | On / Off |
| C,M,Y, K | On / Off |

FIG. 3G

69

| ADJUSTMENT MODE | CORRECTION METHOD |
|---|---|
| HIGH SPEED/ LOW QUALITY | 2 |
| NORMAL SPEED/ NORMAL QUALITY | — |
| LOW SPEED/ HIGH QUALITY | 1 |

| FIG. 6A |
| --- |
| FIG. 6B |

APPARATUS AND METHOD FOR ADJUSTING DENSITY IN IMAGE FORMING

CROSS-REFERENCE TO RELATED APPLICATIONS

This patent application is based on and claims priority under 35 U.S.C. §119 to Japanese Patent Application No. 2006-318200, filed on Nov. 27, 2006, in the Japanese Patent Office, the disclosure of which is incorporated herein by reference.

FIELD OF THE INVENTION

Example embodiments of the present invention relate to an apparatus and method for adjusting density in image forming, and more specifically relate to an apparatus and method for adjusting density in image forming according to various adjustment conditions.

BACKGROUND

Various methods of adjusting density in image forming are used. For example, as described in the Japanese Patent Application Publication No. 2006-79001, toner density may be adjusted when the density of a test pattern formed on a transfer belt, which may be detected by a sensor, does not fall within an acceptable density range.

However, since the acceptable density range is previously set by default, the above-described method may not be applicable to the case in which a user desires to adjust toner even when the detected toner density falls within the acceptable density range. Similarly, the above-described method may not be applicable to the case in which the user desires not to adjust toner even when the detected toner density falls outside the acceptable density range. Further, the above-described method of adjusting density does not allow the user to freely set various other adjustment conditions including, for example, time for performing density adjustment or a type of the test pattern to be formed.

SUMMARY

Example embodiments of the present invention include an apparatus for adjusting density in image forming according to various adjustment conditions. For example, an image forming apparatus may be provided, which includes: a storage that stores a plurality of adjustment condition data sets; an image forming engine that forms a test pattern image of a test pattern using a colorant provided in the image forming apparatus; a detector that detects a density level of the colorant from the test pattern image to output a detected density; and a controller that selects one of the plurality of adjustment condition data sets as a selected adjustment condition data set, and perform density adjustment according to the selected adjustment condition data set.

Other example embodiments of the present invention include a method of adjusting density in image forming according to various adjustment conditions. For example, the method of adjusting density may include: determining whether to generate a test pattern according to condition data specifying time for performing density adjustment; generating a test pattern according to condition data specifying a number or a type of the test pattern when the determining determines to generate the test pattern; forming a test pattern image of the test pattern using a colorant of an image forming apparatus when the determining determines to generate the test pattern; obtaining a density level of the colorant from the test pattern image as a detected density; and adjusting density of the colorant to have an adjusted density level using an adjustment parameter obtained from the detected density when the detected density falls outside an acceptable density range determined by condition data specifying the acceptable density range.

In addition to the above-described example embodiments, the present invention may be practices in various other ways, for example, as an image forming system or a computer readable recording medium including a plurality of computer program instructions that causes a computer to execute the above-described density adjustment method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3A is a table storing condition data specifying time for performing density adjustment, according to an example embodiment of the present invention;

FIG. 3B is a table storing condition data specifying an acceptable density range, according to an example embodiment of the present invention;

FIG. 3C is a table storing condition data specifying a number of density levels to be included in a test pattern, according to an example embodiment of the present invention;

FIG. 3D is a table storing condition data specifying a maximum number of adjustment to be performed, according to an example embodiment of the present invention;

FIG. 3E is a table storing condition data specifying a color separation method to be performed for density adjustment, according to an example embodiment of the present invention;

FIG. 3F is a table storing condition data specifying whether to perform density adjustment on all samples of detected density, according to an example embodiment of the present invention;

FIG. 3G is a table storing condition data specifying a correction method to be performed for density adjustment, according to an example embodiment of the present invention;

Figure 1:
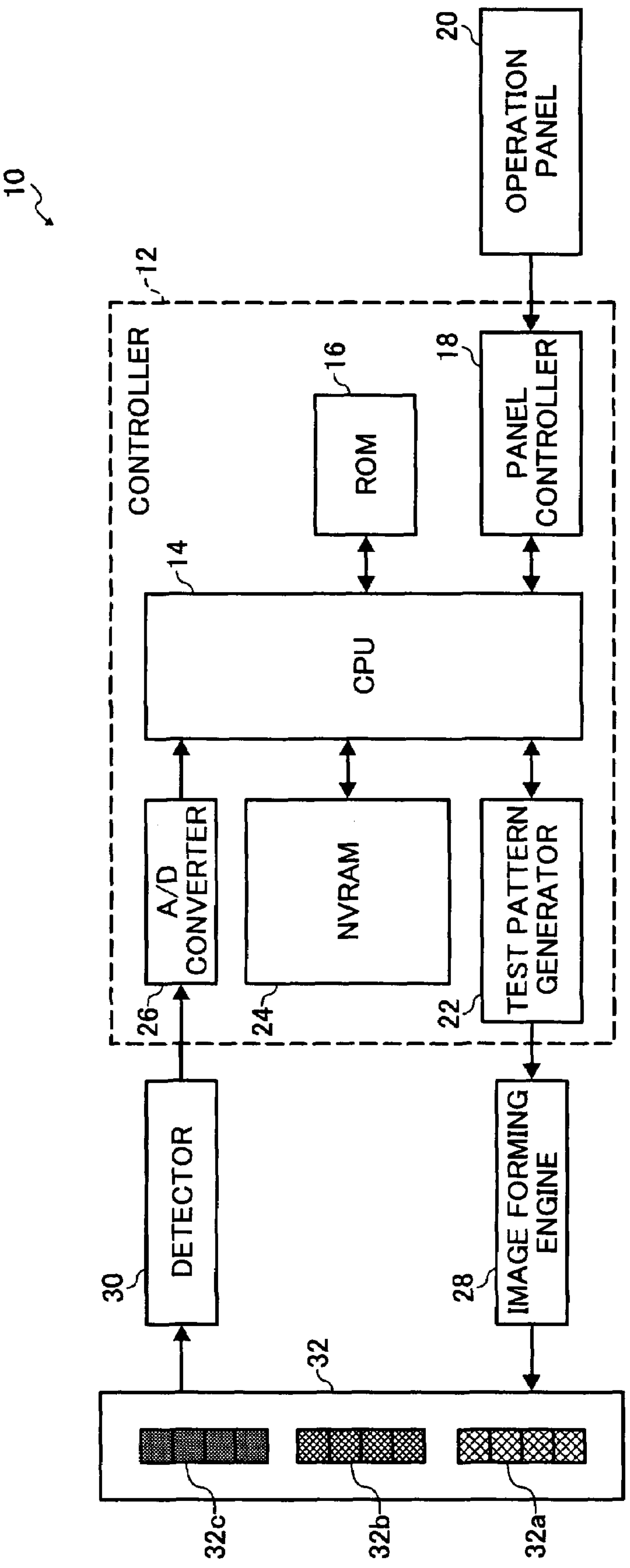
FIG. 1 is a schematic block diagram illustrating the structure of a selected portion of an image forming apparatus according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to the drawings, wherein like reference numerals designate identical or corresponding parts throughout the several views, FIG. 1 illustrates a portion of an image forming apparatus 10 that relates to density adjustment according to an example embodiment of the present invention. The image forming apparatus 10 mainly includes a controller 12, an operation panel 20, a detector 30, and an image forming engine 28.

The operation panel 20 may function as a user interface, which allows a user to interact with the image forming apparatus 10. For example, upon receiving a user instruction, the operation panel 20 may instruct the controller 12 to perform image forming, for example, by responding to a hardware interrupt received from a panel controller 18 of the controller 12. The operation panel 20 may include an input device capable of inputting a user instruction such as a button, key, microphone, keyboard, etc., and an output device capable of outputting information received from the controller 12 such as a display, buzzer, speaker, etc. The input device and the output device may be incorporated into one device, for example, in the form of touch-panel screen.

The image forming engine 28 may include one or more devices to be used for image forming, including an exposure device, charging device, photoconductor, developing device, transfer device including an intermediate transfer body, etc. In this example, the image forming engine 28 forms a plurality of test pattern images 32*a*, 32*b*, and 32*c*, which may be collectively referred to as a test pattern image 32, on an image carrier using a colorant under control of the controller 12. The image carrier may be the photoconductor, the intermediate transfer body such as a transfer belt, or a recording sheet. The colorant may be toner of one or more colors, which may be selected from yellow, magenta, cyan, and black. Alternatively, ink may be used as the colorant depending on the type of the image forming apparatus 10.

The detector 30 detects the density of the test pattern image 32, and output the density as a detected density to the controller 12. For example, when the test pattern image 32 is formed on the photoconductor, the detector 30 may obtain a reflection density from the photoconductor. In another example, when the test pattern image 32 is formed on the intermediate transfer body, the detector 30 may obtain a reflection density or transmission density. Further, when more than one test pattern is formed, for example, each corresponding to the respective colors of cyan, magenta, yellow, and black, the detected density may be obtained for each one of the colors. The detector 30 may have any desired structure. For example, the detector 30 may include a light source such as a laser diode (LD), light emitting diode (LED), electroluminescence (EL), Cathode Fluorescent Lamp (CCFL), etc., and a photosensitive sensor such as a photodiode (PD), charged coupled device (CCD), etc.

The controller 12 controls operation of the image forming apparatus 10. In this example, the controller 12 receives the detected density from the detector 30, and adjusts the density of the colorant to be substantially equal to a target density when the detected density falls outside an acceptable density range. Referring to FIG. 1, the controller 12 may include a central processing unit (CPU) 14, a read only memory (ROM) 16, the panel controller 18, a test pattern generator 22, a nonvolatile random access memory (NVRAM) 24, and an analog/digital (A/D) converter 26.

The A/D converter 26 converts the detected density obtained from the detector 30 from analog to digital. The detected density may be stored in the NVRAM 24.

The CPU 14 may be implemented by any desired processor, such as a microprocessor. The ROM 16 may store various data, such as a density adjustment program. For example, upon activation of the image forming apparatus 10 or upon receiving a request for density adjustment from the user, the CPU 14 may load the density adjustment program from the ROM 16 onto the NVRAM 24, and perform density adjustment according to the density adjustment program. In such case, the NVRAM 24 may function as a work memory of the CPU 14. Alternatively, the density adjustment program may be stored in any other memory or storage device, such as a hard disk drive (HDD) provided in the image forming apparatus 10 or outside of the image forming apparatus 10.

The NVRAM 24, which may be implemented by an Erasable Programmable ROM (EPROM), Electrically Erasable Programmable ROM (EEPROM), or flash memory, may store various data, such as various adjustment condition data to be used for density adjustment including, for example, condition data specifying time for performing density adjustment, condition data specifying an acceptable density range, condition data specifying a type of the test pattern to be generated, condition data specifying a maximum number of performing density adjustment, or condition data specifying a method of adjusting density such as a color separation method or a correction method. The adjustment condition data may be defined by default or according to the user preference. Alternatively, the adjustment condition data may be partially stored in any other desired memory or storage device, such as the ROM 16 or a removable memory that may be accessible from the image forming apparatus 10.

The test pattern generator 22 generates the test pattern under control of the CPU 14, and causes the image forming engine 28 to form the test pattern image 32 on the image carrier using the colorant. In this example, the number or type of the test pattern image 32 to be formed may be determined according to the condition data stored in the NVRAM 24. Further, in this example, a plurality of types of test pattern may be stored in the NVRAM 24, for example, in the form of raster data or density data. In one example, the CPU 14 reads out condition data regarding the test pattern from the NVRAM 24, selects one of the plurality of test patterns that corresponds to the condition data from the NVRAM 24, and sends the selected test pattern to the image forming engine 28.

The image forming apparatus 10 of FIG. 1 may be implemented in various ways, for example, as a printer, facsimile, copier, or multifunctional apparatus (MFP) that performs one or more functions of printing, faxing, and copying. The image forming apparatus 10 may be provided with the function of communicating with any other apparatus through a network. In addition to performing density adjustment as described above, the image forming apparatus 10 may perform image processing or forming according to a user instruction. For example, the image forming apparatus 10 may perform copying by scanning an original image into image data, applying image processing to the image data, and printing the image data on a recording sheet. In another example, the image forming apparatus 10 may perform printing by printing image data received from the network. In another example, the image forming apparatus 10 may perform faxing or sending data through the network.

Figure 2:
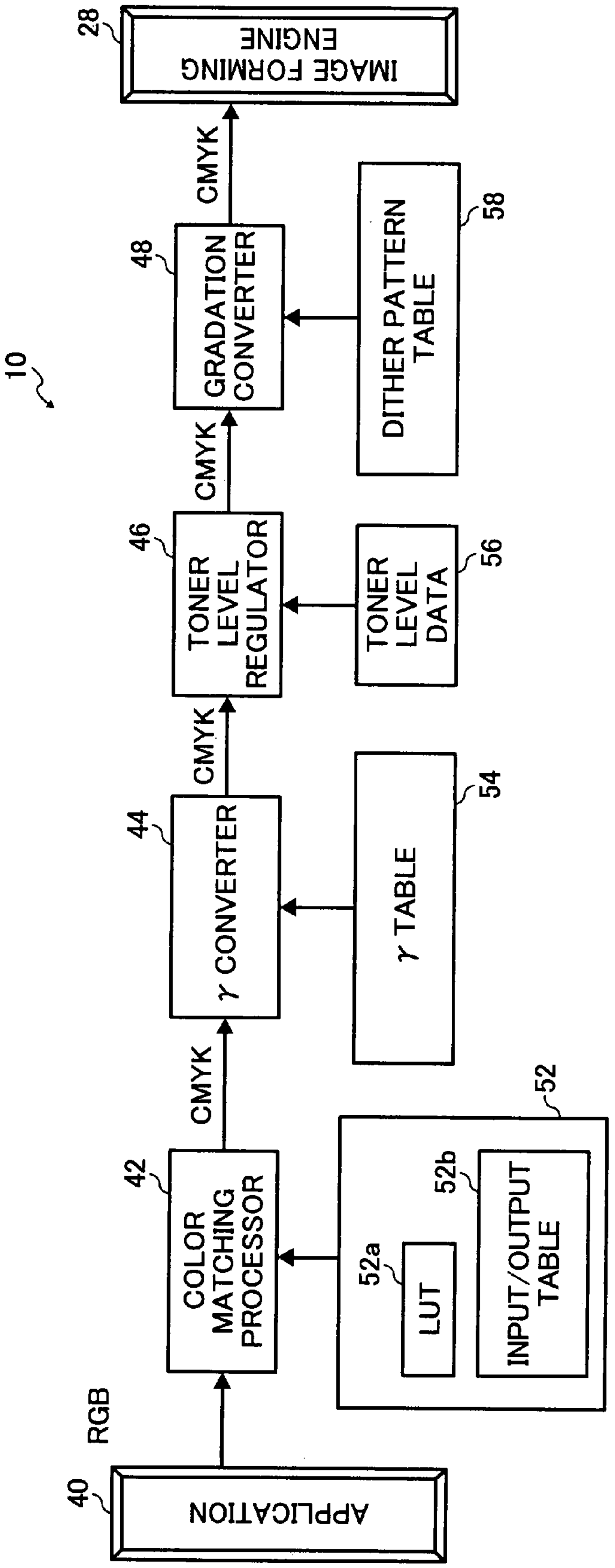
FIG. 2 is a schematic block diagram illustrating the structure of a selected portion of the image forming apparatus shown in FIG. 1 according to an example embodiment of the present invention.

Referring now to FIG. 2, a selected portion of the image forming apparatus 10 that relates to image forming is explained according to an example embodiment of the present invention. For the descriptive purpose, operation of forming a color image according to color image data input by an application 40 is explained. In this example, the application 40 may correspond to a scanner application or a printer application provided in the image forming apparatus 10. Alternatively, the application 40 may correspond to any application, which may be provided on any desired information processing apparatus connectable to the image forming apparatus 10. In this example, the image forming apparatus 10 converts the image data, which is input as RGB data, to CMYK image data before sending the image data to the image forming engine 28.

Still referring to FIG. 2, the image forming apparatus 10 additionally includes a color matching processor 42, a gamma converter 44, a toner level regulator 46, a gradation converter 48, a color profile 52 including a look up table (LUT) 52*a* and an input/output table 52*b*, a gamma table 54, toner level data 56, and a dither pattern table 58. Any one of the color profile 52, gamma table 54, toner level data 56, and dither pattern table 58 may be stored in any desired memory, such as the ROM 16 or the NVRAM 24.

The RGB image data generated by the application 40 may be stored in the input/output table 52*b* of the color profile 52. The color matching processor 42 reads out the RGB image data from the input/output table 52*b*, converts the RGB image data into CMYK image data, and stores the CMYK image data in the input/output table 52*b*. In this example, the color matching processor 42 first converts the RGB color space, which is device specific, to the color space that is device independent such as CIE1976L*a*b*, CIE 1976L*u*v*, or XYZ color space, by referring to the LUT 52*a* or calculating using a conversion equation. The color matching processor 42 then converts the color space that is device independent to the CMYK color space, which is device specific, by referring to the LUT 52*a* or calculating using a conversion equation. For example, the color matching processor 42 may convert the RGB image data, which may be read from the input/output table 52*b*, to Lab image data, such as CIE1976L*a*b*, by referring to the LUT 52*a*. The color matching processor 42 then converts the Lab image data to the CMYK image data, for example, by referring to the LUT 52*a*, and inputs the CMYK image data in the input/output table 52*b*. In this example, a predetermined number of samples of the image data may be stored in the LUT 52*a* or the input/output table 52*b*. The samples of the image data, which are not stored in the LUT 52*a* or the input/output table 52*b*, may be stored in a different memory space or obtained using an interpolation method when needed.

The gamma converter 44 applies gamma correction to the CMYK image data using data obtainable from the gamma table 54. The gamma table 54 may store gamma characteristics data, which indicates the correspondence between the density gradation of the CMYK image data being input and the density gradation of the CMYK image data being output. The gamma table 54 may be prepared for each one of a plurality of resolutions or each one of a plurality of image forming modes. The gamma converter 44 outputs the processed CMYK image data, which may be expressed as the density gradation data having a plurality of samples each having a specific density gradation level, to the toner level regulator 46. In this example, the image data may be expressed by 8-bit such that the gradation levels may range between 0 and 255. However, the number of gradation levels may be set differently.

The toner level regulator 46 controls the total amount of the toner to be equal to or below a fixed toner level, which may be stored as the toner level data 56. For example, the maximum density level of the toner obtainable from the CMYK image data may be made equal to or below a fixed density level, which may be stored as the toner level data 56. The toner level data 56 may be previously determined depending on the capability of the image forming engine 28.

The gradation converter 48 converts the CMYK image data from the density gradation data to area gradation data using data obtainable from the dither pattern table 58. The data stored in the dither pattern table 58 may indicate the correspondence between a density gradation level and a dither pattern having a specific number of dots per unit area. The dither pattern table 58 may be prepared for each one of a plurality of resolutions or each one of a plurality of image forming modes. The gradation converter 48 outputs the CMYK image data expressed as the area tone data to the image forming engine 28.

As described above referring to FIG. 1, the image forming apparatus 10 stores various condition data in the NVRAM 24, which may be used by the controller 12 when performing density adjustment. In this example, the image forming apparatus 10 is provided with an adjustment time table 60 of FIG. 3A storing the condition data specifying the time for performing density adjustment, an acceptable range table 62 of FIG. 3B storing the condition data specifying the acceptable density range, a test pattern level table 64 of FIG. 3C storing the condition data specifying the number of density levels to be included in the test pattern, an adjustment number table 65 of FIG. 3D storing the condition data specifying the maximum number of adjustment to be performed, a color separation method table 66 of FIG. 3E storing the condition data specifying a color separation method to be performed for density adjustment, an all sample adjustment table 68 of FIG. 3F storing the condition data specifying whether to perform density adjustment on all detected density samples, and a correction method table 69 of FIG. 3G storing the condition data specifying a correction method to be performed for density adjustment. Any one of the condition data stored in the table shown in FIGS. 3A to 3G may be previously set by default. Alternatively, any one of the condition data stored in the table shown in FIGS. 3A to 3G may be set according to the user preference. For example, the operation panel 20 of FIG. 1 may display a setting screen, which allows the user to input or change the various condition data. Upon receiving the user input, the panel controller 18 of FIG. 1 may update the corresponding one of the tables shown in FIGS. 3A to 3G according to the user input.

Referring to FIG. 3A, the time for performing density adjustment may be selected from any one of the time when the image forming apparatus 10 is turned on ("POWERED ON"), the time when the toner is replaced ("TONER REPLACED"), the time when a predetermined number of pages is printed ("NO. OF PRINTED PAGES"), the time when a waiting time period reaches a predetermined value ("WAITING TIME"), and the time when the request from the user is received (USER REQUEST). The user may determine whether to perform density adjustment at one or more of the above-described times by selecting "ON" or "OFF". Additionally, the user may determine the specific time for performing density adjustment by selecting a specific value, such as the number of printed pages or the waiting time period.

Referring to FIG. 3B, the acceptable density range may be selected from any one of the acceptable density ranges of 20%, 10%, and 5% according to the user input. When the acceptable density range of 20% is selected, the CPU 14 performs density adjustment when the percentage of the absolute value of a difference value ΔD between the detected density Dd and the target density Dt relative to the target density Dt, which may be expressed as $|\Delta D|/Dt*100\%$, is greater than 20%. Similarly, when the acceptable density range of 10% is selected, the CPU 14 performs density adjustment when the percentage value $|\Delta D|/Dt*100\%$ is greater than 10%. Similarly, when the acceptable density range of 5% is selected, the CPU 14 performs density adjustment when the percentage value $|\Delta D|/Dt*100\%$ is greater than 5%. Further, in this example, the operation panel 20 may display a list of the acceptable density ranges that are available for use, and allow the user to select one of the acceptable density ranges from the list. Alternatively, the operation panel 20 may display a list of adjustment modes or image forming modes that are available, allow the user to select one of the modes from the list, and select one of the acceptable density ranges that matches the selected mode. Specifically, in this example, when a high speed/low quality mode is selected, the acceptable density range having a larger value, such as 20%, may be selected. When a normal speed/normal quality mode is selected, the acceptable density range of 10% may be selected. When a low speed/high quality mode is selected, the acceptable density range having a smaller value, such as 5%, may be selected. The correspondence between the adjustment or image forming modes and the acceptable density ranges may be previously stored in the table as illustrated in FIG. 3B.

Referring to FIG. 3C, the number of density levels to be included in the test pattern may be selected from any one of five, seven, and eleven according to the user input. When the density levels of five is selected, the CPU 14 instructs the test pattern generator 22 to generate a test pattern having five density levels of 0%, 25%, 50%, 75%, and 100%. When the density levels of seven is selected, the CPU 14 instructs the test pattern generator 22 to generate a test pattern having seven density levels of 0%, 22%, 33%, 56%, 67%, 78%, and 100%. When the density levels of eleven is selected, the CPU 14 instructs the test pattern generator 22 to generate a test pattern having eleven density levels of 0%, 10%, 20%, 30%, 40%, 50%, 60%, 70%, 80%, 90%, and 100%. In one example, the operation panel 20 may display a list of a plurality of density level numbers that are available for use, and allow the user to select one of the plurality of density level numbers. In another example, the operation panel 20 may display a list of a plurality of adjustment modes or image forming modes, allow the user to select one of the plurality of modes, and select one of the plurality of density level numbers that matches the selected mode. Specifically, in this example, when the high speed/low quality mode is selected, the density level number having a smaller value, such as five, may be selected. When the normal speed/normal quality mode is selected, the density level number of seven may be selected. When the low speed/high quality mode is selected, the density level number having a larger value, such as eleven, may be selected. The correspondence between the adjustment or image forming modes and the density level numbers may be previously stored in the table as illustrated in FIG. 3C.

Referring to FIG. 3D, the maximum number of adjustment to be performed may be selected from any one of the numbers 1, 2, and 3 according to the user input. When the adjustment number 1 is selected, the CPU 14 performs density adjustment once upon receiving the user request or upon detecting the time for performing density adjustment. When the adjustment number 2 is selected, the CPU 14 performs density adjustment up to twice such that the density of the colorant may be adjusted with higher precision. When the adjustment number 3 is selected, the CPU 14 performs density adjustment up to three times such that the density of the colorant may be adjusted with higher precision. In this example, the adjustment number may be set for each one of the colors to be adjusted. In one example, the operation panel 20 may display a list of the adjustment numbers that are available for use, and allow the user to select one of the adjustment numbers from the list. In another example, the operation panel 20 may display a list of the adjustment or image forming modes that are available, allow the user to select one of the modes from the list, and select one of the adjustment numbers that matches the selected mode. Specifically, in this example, when the high speed/low quality mode is selected, the adjustment number of 1 may be selected. When the normal speed/normal quality mode is selected, the adjustment number of 2 may be selected. When the low speed/high quality mode is selected, the adjustment number of 3 may be selected. The correspondence between the adjustment or image forming modes and the adjustment numbers may be previously stored as illustrated in FIG. 3D.

Referring to FIG. 3E, the color separation method, which may be a part of an adjustment method to be performed, may be selected from the CMYK method in which all colors of cyan, magenta, yellow, and black are adjusted together, the CMY method in which the three colors of cyan, magenta, and yellow, and the single black color are adjusted separately from each other, and the C,M,Y,K method in which the colors of cyan, magenta, yellow, and black are adjusted separately from one another. In one example, the operation panel 20 may display a list of color separation methods available for use, and allow the user to select one of the color separation methods. In another example, the operation panel 20 may display a list of adjustment modes or image forming modes available, allow the user to select one of the modes, and select one of the color separation methods that matches the selected mode. Specifically, in this example, when the high speed/low quality mode is selected, the C,M,Y,K method may be selected. When the low speed/high quality mode is selected, the CMYK method may be selected. The correspondence between the adjustment or image forming modes and the color separation methods may be previously stored in the table of FIG. 3E.

Figure 4A:
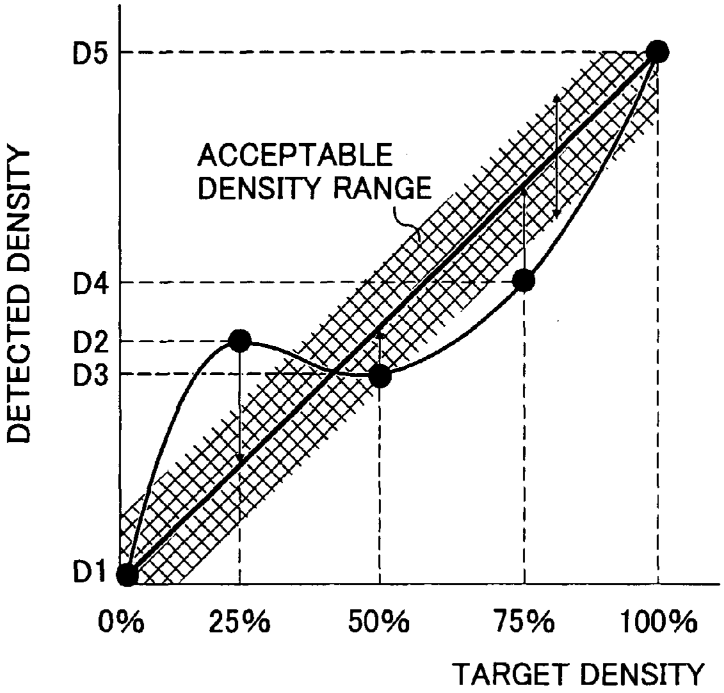
FIG. 4A is a table illustrating operation of adjusting all samples of detected density, according to an example embodiment of the present invention.
Figure 4B:
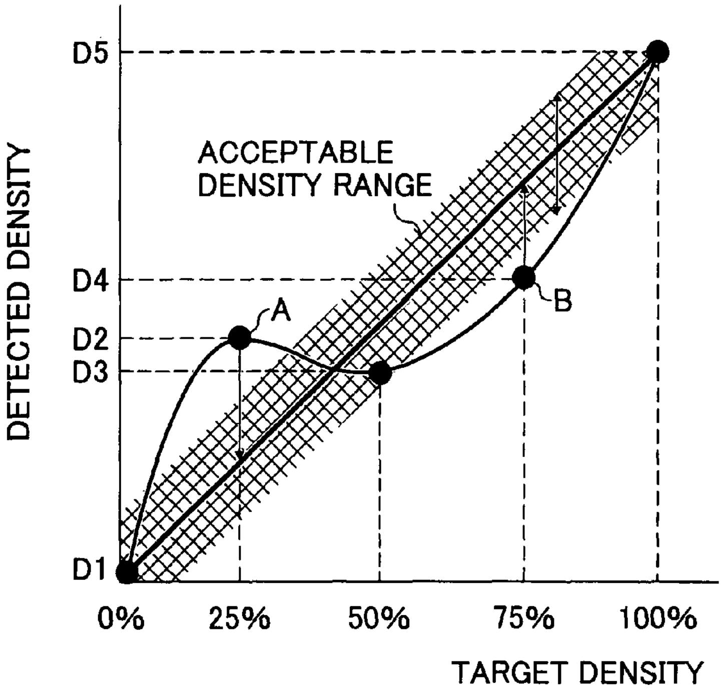
FIG. 4B is a table illustrating operation of adjusting one or more samples of detected density that fall outside an acceptable density range, according to an example embodiment of the present invention.

Referring to FIG. 3F, the status of the condition data specifying whether to apply adjustment to all density samples ("all sample adjustment data") may be defined to determine an adjustment method to be performed according to the user input. When the all sample adjustment data is set to "ON", the CPU 14 applies adjustment to all detected density samples, for example, as illustrated in FIG. 4A. When the all sample adjustment data is set to "OFF", the CPU 14 applies adjustment to one or more detected density samples, each of which has a detected density level that falls outside the acceptable density range, for example, as illustrated in FIG. 4B. In one example, the operation panel 20 may allow the user to select ON or OFF of the all sample adjustment data. In another example, the operation panel 20 may display a list of adjustment modes or image forming modes available, allow the user to select one of the modes, and select ON or OFF of the all sample adjustment data according to the selected mode. For example, when the high speed/low quality mode is selected, the all sample adjustment data may be set to OFF. When the low speed/high quality mode is selected, the all sample adjustment data may be set to ON. The correspondence between the adjustment or image forming modes and the all sample adjustment data may be previously stored in FIG. 3F.

Referring to FIG. 3G, the correction method, which may be a part of an adjustment method to be performed, may be selected from any one of the first correction method in which data stored in the LUT 52*a* of FIG. 2 is corrected, and the second correction method in which data stored in the input/output table 52*b* of FIG. 2 is corrected. When the first correction method is selected, the CPU 14 uses the first correction method to adjust density of the colorant by correcting the data stored in the LUT 52*a*, for example, as described below referring to FIG. 8A. When the second correction method is selected, the CPU 14 uses the second correction method to adjust density of the colorant by correcting the data stored in the input/output table 52*b*, for example, as described below referring to FIG. 8B. In one example, the operation panel 20 may display a list of the first correction method and the second correction method, and allow the user to select one of the first correction method and the second correction method. In another example, the operation panel 20 may display a list of adjustment modes or image forming modes, allow the user to select one of the modes, and select the correction method that matches the selected mode. Specifically, in this example, when the high speed/low quality adjustment mode is selected, the second correction method may be selected. When the low speed/high quality adjustment mode is selected, the first correction method may be selected. Alternatively, when the high speed image forming mode is selected, the first correction method may be selected. When the low speed image forming mode is selected, the second correction method may be selected. The correspondence between the adjustment or image forming modes and the correction methods may be previously stored in FIG. 3G.

The adjustment condition data illustrated in any one of the tables 3A to 3G or any other kinds of adjustment condition data may be stored in any desired form other than the above-described example. For example, one or more tables selected from the tables 3A to 3G may be combined into one table.

Figure 5:
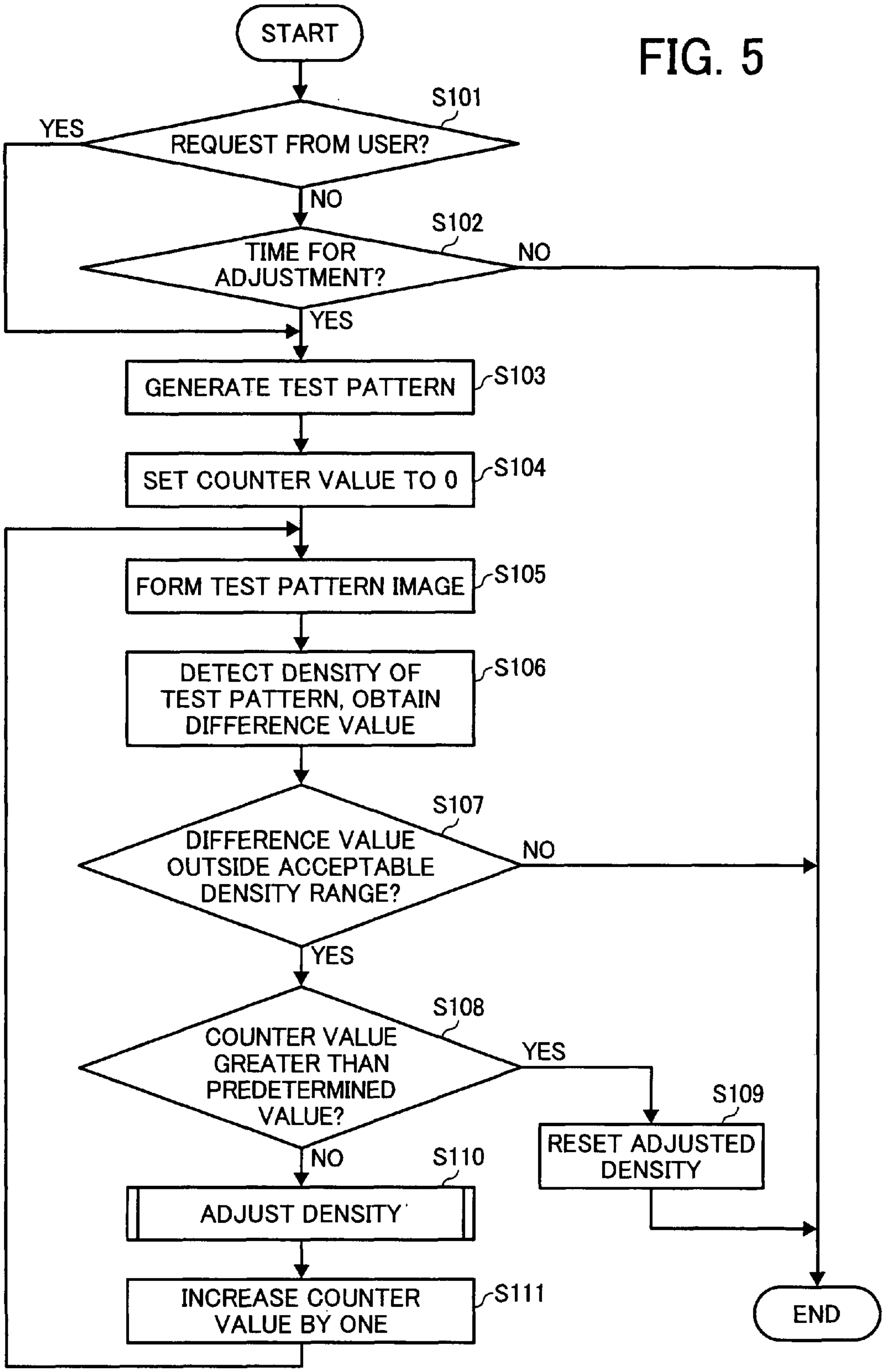
FIG. 5 is a flowchart illustrating operation of performing density adjustment, carried by the image forming apparatus shown in FIG. 1, according to an example embodiment of the present invention.

Referring now to FIG. 5, operation of performing density adjustment, carried by the image forming apparatus 10 of FIG. 1, is explained according to an example embodiment of the present invention. The operation of FIG. 5 may be performed by the CPU 14 according to the density adjustment program.

S101 determines whether a user request, which requests for density adjustment, is received from the user through the panel controller 18. When it is determined that the user request is received ("YES" at S101), the operation proceeds to S103. When it is determined that the user request is not received ("NO" at S101), the operation proceeds to S102.

S102 determines whether a current time corresponds to the time for performing density adjustment, which is specified by the condition data stored in the NVRAM 24. For example, the CPU 14 may refer to the condition data stored in the adjustment time table 60 of FIG. 3A, and determine whether to perform density adjustment according to the condition data. When it is determined that the current time corresponds to the time for performing density adjustment ("YES" at S102), the operation proceeds to S103. When it is determined that the current time does not correspond to the time for performing density adjustment ("NO" at S102), the operation ends.

S103 causes the test pattern generator 22 to generate a test pattern according to the condition data stored in the NVRAM 24. For example, the CPU 14 may refer to the condition data stored in the test pattern level table 64 of FIG. 3C, and causes the test pattern generator 22 to generate the test pattern having the number of density levels specified by the condition data. Additionally or alternatively, the CPU 14 may refer to the condition data stored in the color separation method table 66 of FIG. 3E, and causes the test pattern generator 22 to generate the test pattern having one or more colors specified by the condition data stored in the color separation method table 66.

S104 sets a counter value, which indicates the number of adjustment that has been performed, to 0.

S105 causes the image forming engine 28 to form a test pattern image of the test pattern generated at S103 on the image carrier using the colorant of the image forming apparatus 10. The number or type of the colorant to be used may be determined according to the type of the test pattern being generated at S103.

S106 causes the detector 30 to detect a density of the colorant from the test pattern image to obtain a detected density. Once the detected density is obtained, which may be converted by the A/D converter 26, the CPU 14 obtains a difference value ΔD between the detected density and the target density.

S107 determines whether the difference value ΔD falls outside the acceptable density range, which may be specified by the condition data stored in the NVRAM 24. For example, the CPU 14 may refer to the condition data stored in the acceptable range table 62 of FIG. 3B, and obtains the acceptable density range specified by the condition data. Further, in this example, whether the difference value ΔD falls outside the acceptable density range may be determined using the percentage value as described above referring to FIG. 3B. When it is determined that the difference value ΔD falls outside the acceptable density range ("YES" at S107), the operation proceeds to S108. When it is determined that the difference value ΔD falls within the acceptable density range ("NO" at S107), the operation ends.

S108 determines whether the counter value, which indicates the number of adjustment that has been performed, is greater than an adjustment number specified by the condition data stored in the adjustment number table 65 shown in FIG. 3D. When it is determined that the counter value is greater than the adjustment number ("YES" at S108), the operation proceeds to S109. When it is determined that the counter value is less than the adjustment number ("NO" at S108), the operation proceeds to S110.

S110 adjusts density of the colorant using an adjustment method, which may be specified by the condition data stored in any one of the tables 66, 68, and 69. For example, an adjustment parameter may be obtained from the difference value ΔD between the detected density and the target density, and the density of the colorant may be adjusted by correcting data using the adjustment parameter.

S111 increases the counter value by one, and the operation returns to S105 to repeat S105 to S108.

When it is determined that the counter value is greater than the adjustment number ("YES" at S108), the operation proceeds to S109 to generate an error message to notify the user. Alternatively, the CPU 14 may notify a service center, which may be in charge of managing the image forming apparatus 10, for example, through a network or a communication line. In this manner, any failure, such as a failure caused by the detector 30, may be analyzed or corrected. At this time, if the density of the colorant has been adjusted at S110, the adjusted density level is changed back to the original density level obtained by the detector 30.

The operation of FIG. 5 may be performed in various other ways. For example, S104 and S111 may not be performed depending on the condition data specifying the maximum number of adjustment to be performed, which may be stored in the adjustment number table 65 of FIG. 3D.

Figures 6, 6A:
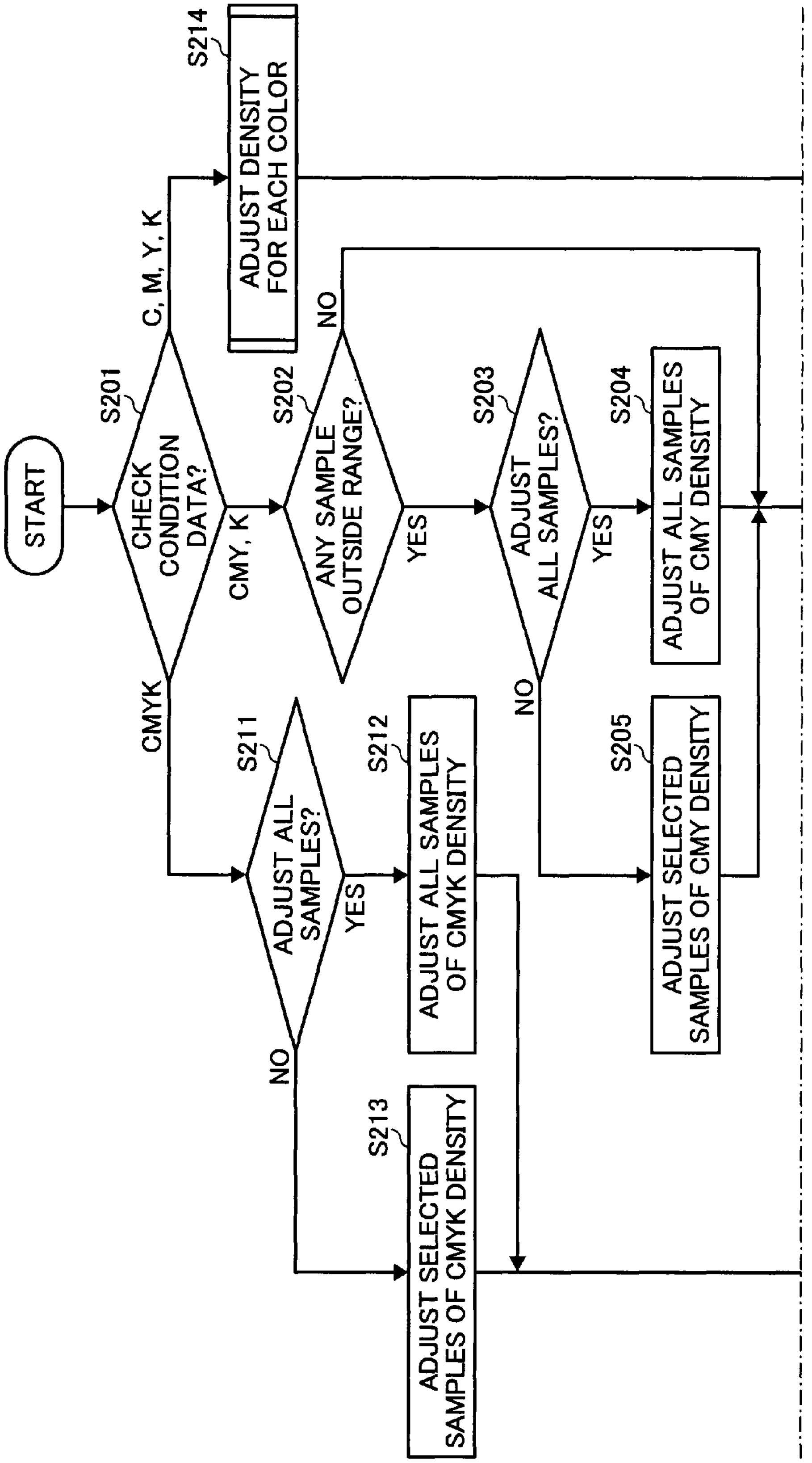
FIG. 6 is a flowchart illustrating operation of adjusting density according to condition data, performed by the image forming apparatus shown in FIG. 1, according to an example embodiment of the present invention.
Figure 6B:
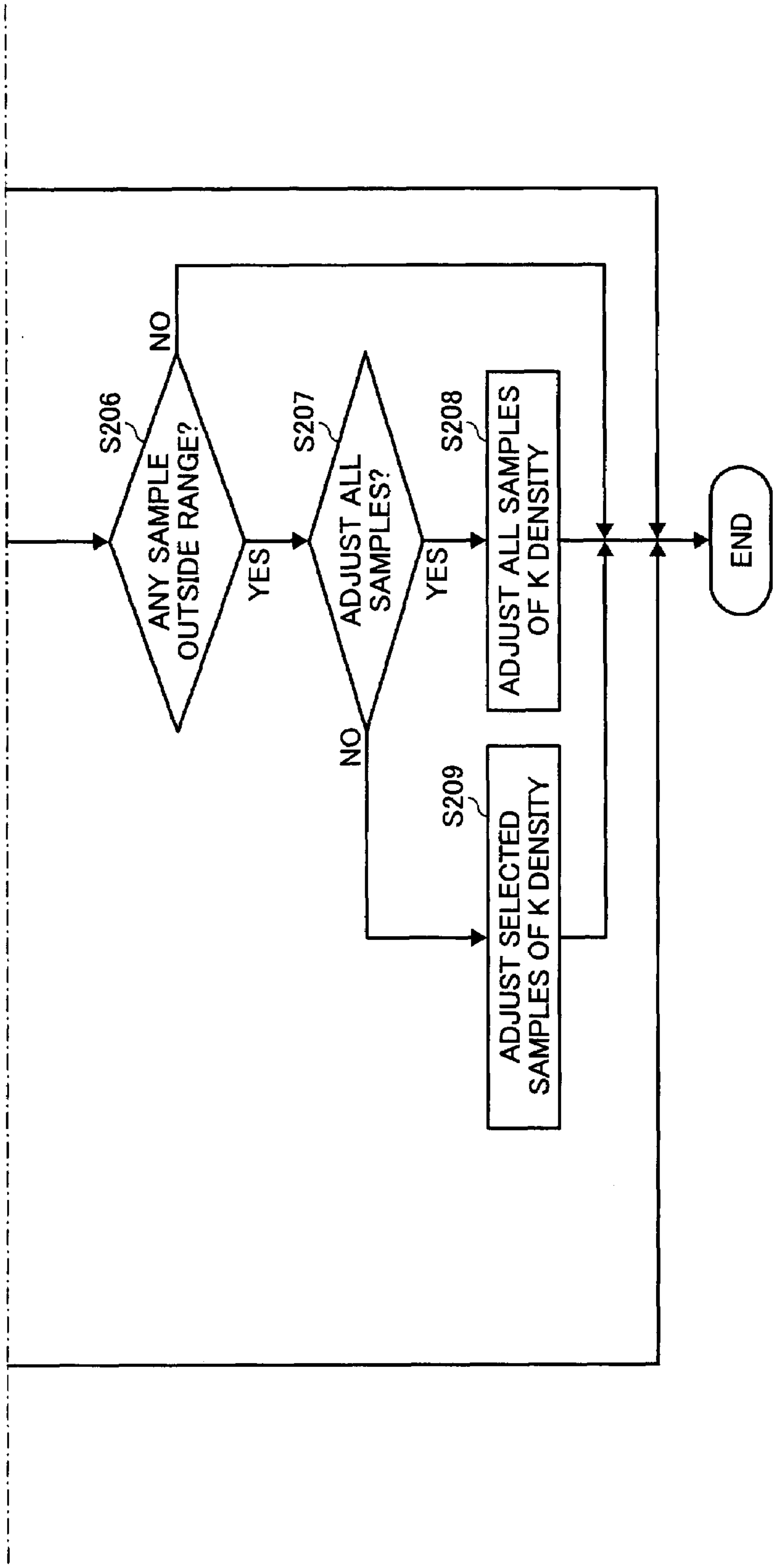

Referring now to FIG. 6, operation of adjusting density, which may be performed at S110 of FIG. 5, is explained according to an example embodiment of the present invention.

S201 determines a color separation method to be used for density adjustment, for example, by referring to the condition data stored in the color separation method table 66 shown in FIG. 3E. When the condition data indicates that the CMYK method is selected ("CMYK" at S201), the operation proceeds to S211. When the condition data indicates that the CMY, K method is selected ("CMY, K" at S201), the operation proceeds to S202. When the condition data indicates that the C,M,Y,K method is selected ("C,M,Y,K" at S201), the operation proceeds to S214.

When the "CMYK" method is selected at S201, S211 determines whether to adjust all samples of the detected density, for example, by referring to the condition data, i.e., the status of the all sample adjustment data, stored in the all sample adjustment table 68 shown in FIG. 3F. When it is determine that all samples are to be adjusted, i.e., the all sample adjustment data is set to "ON" ("YES" at S211), the operation proceeds to S212. When it is determined that one or more selected samples are to be adjusted, i.e., the all sample adjustment data is set to "OFF" ("NO" at S211), the operation proceeds to S213.

S212 applies adjustment to all detected density samples, which are obtained from the test pattern image having the CMYK colors, and the operation ends. For example, referring back to FIG. 4A, when the detected density samples having the density levels D1, D2, D3, D4, and D5 are respectively obtained from the CMYK test pattern image having the density levels 0%, 25%, 50%, 75%, and 100%, and when any one of the detected density samples falls outside the acceptable density range (shown as the "hatched" area), all detected density samples are adjusted. For example, an adjustment parameter may be obtained for each one of the samples having the detected density levels D1 to D5, from the difference value ΔD between the detected density levels D1 to D5 and the corresponding target density levels 0% to 100%. Using the adjustment parameter, the detected density level of each one of the samples may be adjusted using a correction method, which may be specified by the condition data stored in the correction method table 69 shown in FIG. 3G. Since all density samples are adjusted, image quality such as color balance or tone reproducibility may increase.

S213 applies adjustment to one or more detected density samples obtained from the CMYK test pattern image, each having a density level that falls outside the acceptable density range, and the operation ends. For example, referring back to FIG. 4B, when the detected density samples having the density levels D1, D2, D3, D4, and D5 are respectively obtained from the CMYK test pattern image having the density levels 0%, 25%, 50%, 75%, and 100%, and when any one of the detected density samples falls outside the acceptable density range (shown as the "hatched" area), the density samples that fall outside the acceptable density range, i.e., the samples A and B are adjusted. For example, an adjustment parameter may be obtained for each one of the samples A and B respectively having the detected density levels D2 and D4, from the difference value ΔD between the detected density levels D2 and D4 and the corresponding target density levels 25% and 75%. Using the adjustment parameter, the detected density level of each one of the samples A and B may be adjusted using a correction method, which may be specified by the condition data stored in the correction method table 69 shown in FIG. 3G. Since only the samples that fall outside the acceptable density range are adjusted, workload or time for adjusting density may decrease.

Referring back to FIG. 6, when the "CMY, K" method is selected at S201, S202 determines whether any one of the detected density samples obtained from the test pattern image having the CMY colors falls outside the acceptable density range. When one or more detected density samples obtained from the CMY test pattern image fall outside the acceptable density range ("YES" at S202), the operation proceeds to S203. Otherwise ("NO" at S202), the operation proceeds to S206.

S203 determines whether to adjust all samples of the detected density, for example, by referring to the condition data, i.e., the status of the all sample adjustment data, stored in the all sample adjustment table 68 of FIG. 3F. When it is determined that all sample are to be adjusted, i.e., the all sample adjustment data is set to "ON" ("YES" at S203), the operation proceeds to S204 to apply adjustment to all detected density samples obtained from the CMY test pattern image, for example, as described above referring to FIG. 4A. When it is determined that one or more selected samples are to be adjusted, i.e., the all sample adjustment data is set to "OFF" ("NO" at S203), the operation proceeds to S205 to apply adjustment to one or more detected density samples obtained from the CMY test pattern image, each having a density level that falls outside the acceptable density range, for example, as described above referring to FIG. 4B. After performing S204 or S205, the operation proceeds to S206.

S206 determines whether any one of the detected density samples obtained from the test pattern image having the K color falls outside the acceptable density range. When one or more detected density samples obtained from the K test pattern image fall outside the acceptable density range ("YES" at S206), the operation proceeds to S207. Otherwise ("NO" at S206), the operation ends.

S207 determines whether to adjust all samples of the detected density, for example, by referring to the condition data, i.e., the status of the all sample adjustment data, stored in the all sample adjustment table 68 shown in FIG. 3F. When it is determined that all samples are to be adjusted, i.e., the all sample adjustment data is set to "ON" ("YES" at S207), the operation proceeds to S208 to apply adjustment to all detected density samples obtained from the K test pattern image, for example, as described above referring to FIG. 4A. When it is determined that one or more selected samples are to be adjusted, i.e., the all sample adjustment data is set to "OFF" ("NO" at S207), the operation proceeds to S209 to apply adjustment to one or more detected density samples obtained from the K test pattern image, each having a density level that falls outside the acceptable density range, for example, as described above referring to FIG. 4B. After performing S208 or S209, the operation ends.

The operation of FIG. 6 may be performed in various other ways. For example, any one of the above-described steps may be performed in a different order. Preferably, in this example, when the CMY, K method is selected at S201, the density samples obtained from the CMY test pattern image is adjusted before adjusting the density samples obtained from the K test pattern image.

Figure 7:
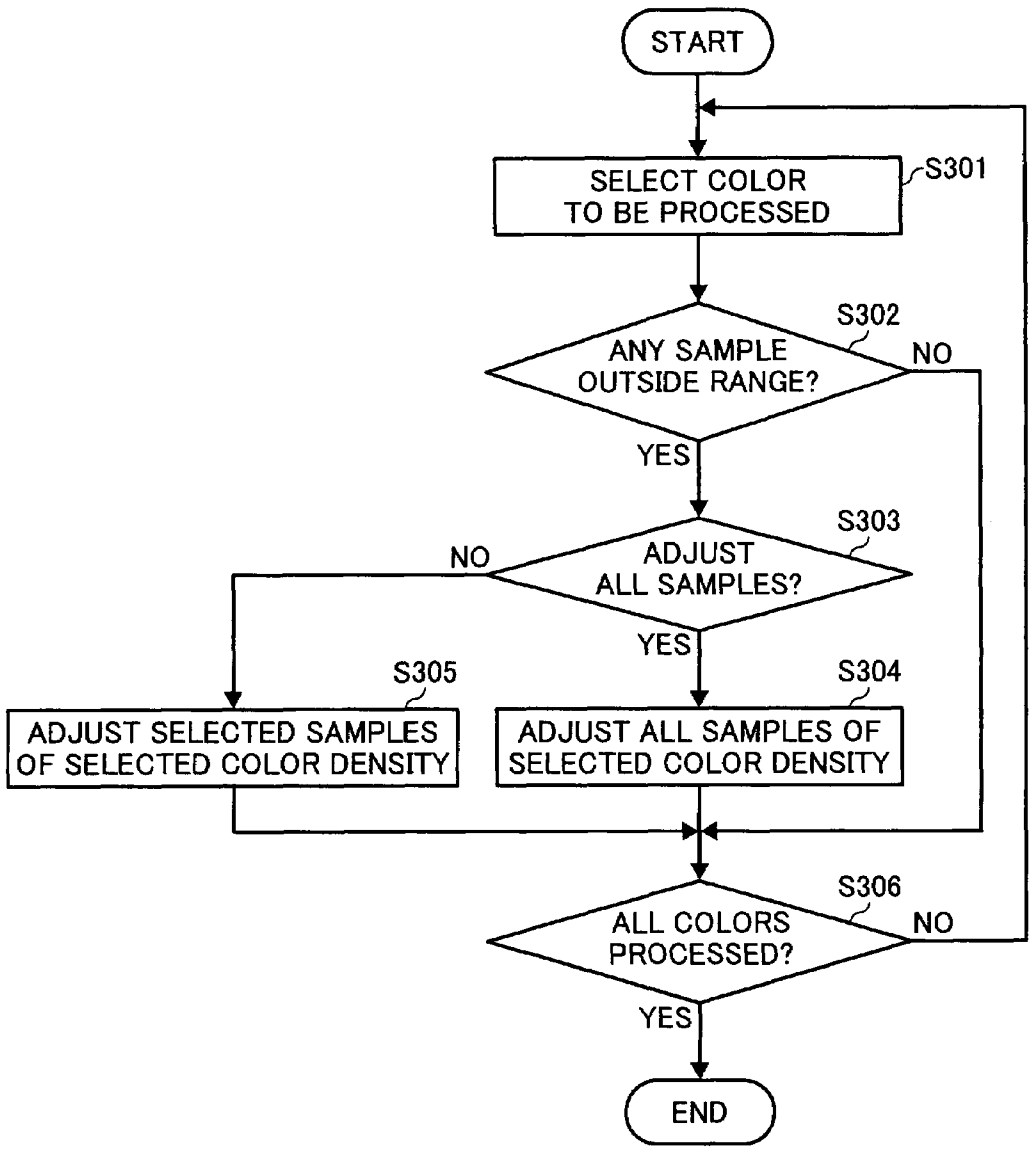
FIG. 7 is a flowchart illustrating operation of adjusting density independently for each type of a colorant, performed by the image forming apparatus shown in FIG. 1, according to an example embodiment of the present invention.

Referring now to FIG. 7, operation of adjusting density independently for each one of the colors of cyan, magenta, yellow, and black, performed at S214 of FIG. 7, is explained according to an example embodiment of the present invention.

S301 selects a single color to be processed from the colors of cyan, magenta, yellow, and black. For example, the CPU 14 may arbitrarily assign an identification number i to each one of the colors of cyan, magenta, yellow, and black. In this example, the cyan, magenta, yellow, and black are respectively assigned with the identification numbers 1, 2, 3, and 4. The identification number may determine the order of processing each color.

S302 determines whether any one of the detected density samples obtained from a test pattern image having the selected color falls outside the acceptable density range. When it is determined that any one of the detected density samples obtained from the test pattern image falls outside the acceptable density range ("YES" at S302), the operation proceeds to S303. When it is determined that none of the detected density samples obtained from the test pattern image falls outside the acceptable density range ("NO" at S302), the operation proceeds to S306.

S303 determines whether to adjust all samples of the detected density, for example, by referring to the condition data, i.e., the status of the all sample adjustment data, stored in the all sample adjustment table 68 shown in FIG. 3F. When it is determined that all samples are to be adjusted, i.e., the all sample adjustment data is set to "ON" ("YES" at S303), the operation proceeds to S304 to apply adjustment to all detected density samples obtained from the test pattern image having the selected color, for example, as described above referring to FIG. 4A. When it is determined that one or more selected samples are to be adjusted, i.e., the all sample adjustment data is set to "OFF" ("NO" at S303), the operation proceeds to S305 to apply adjustment to one or more detected density samples obtained from the test pattern image having the selected color, each having a density level that falls outside the acceptable density range, for example, as described above referring to FIG. 4B. After performing S304 or S305, the operation proceeds to S306.

S306 determines whether all colors of cyan, magenta, yellow, and black have been processed. When it is determined that all colors have been processed ("YES" at S306), the operation ends. When it is determined that one or more colors are not processed ("NO" at S306), the operation returns to S301 to select a color to be processed.

Figure 8A:
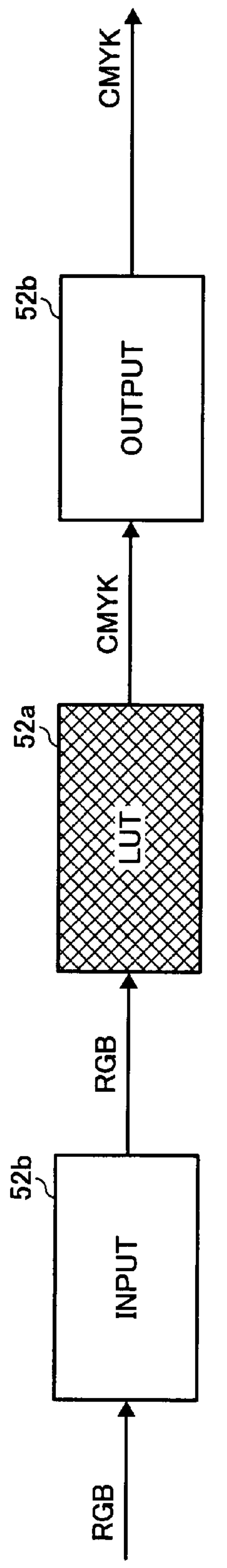
FIG. 8A is an illustration for explaining a correction method, performed by the image forming apparatus shown in FIG. 1, according to an example embodiment of the present invention.

Referring to FIG. 8A, the first correction method mentioned above referring to FIG. 3G is explained. In FIG. 8A, the input table of the input/output table 52*b* storing the RGB data and the output table of the input/output table 52*b* storing the CMYK data are illustrated separately. Alternatively, as illustrated in FIG. 2, the input table and the output table may be implemented by one table. The first correction method corrects the color reproduction data stored in the LUT 52*a*, which indicates the correspondence between the Lab color space and the RGB color space, or the correspondence between the Lab color space and the CMYK color space. For example, referring to FIG. 4B, in order to correct the sample A having the detected density level D2 for the target density level 25%, the density level expressed in the CMYK color space ("the CMYK density level") that indicates the target density level of 25% is obtained from the output table 52*b*. The density level expressed in the RGB color space ("the RGB density level") that corresponds to the CMYK density level of 25% is obtained from the input table 52*b*. The density level expressed in the Lab color space ("the Lab density level") that corresponds to the RGB density level of 25% is obtained from the LUT 52*a*, and corrected so that the difference value ΔD, which is the difference between the detected density level D2 and the target density level of 25%, becomes 0 or within a predetermined range ε. The range ε may correspond to a tolerance for convergence, which may be used in numerical analysis. In one example, the Lab density level, which may be stored in the LUT 52*a* as the detected density level D2 of the sample A, may be corrected so as to have the target density level of 25%. In another example, another sample having the Lab density level of 25% may be entered into the LUT 52*a* in a corresponding manner with the RGB density level equal to 25% to cause the LUT 52*a* to return the Lab density level of 25% when the RGB density level of 25% is input, for example, through the use of an interpolation method. Since the first correction method requires calculation of the Lab density level using an adjustment parameter obtained from the difference value ΔD to correct the CMYK density level, workload or time may increase while image quality may increase. The Lab density level may be calculated in various ways using any desired known method.

Figure 8B:
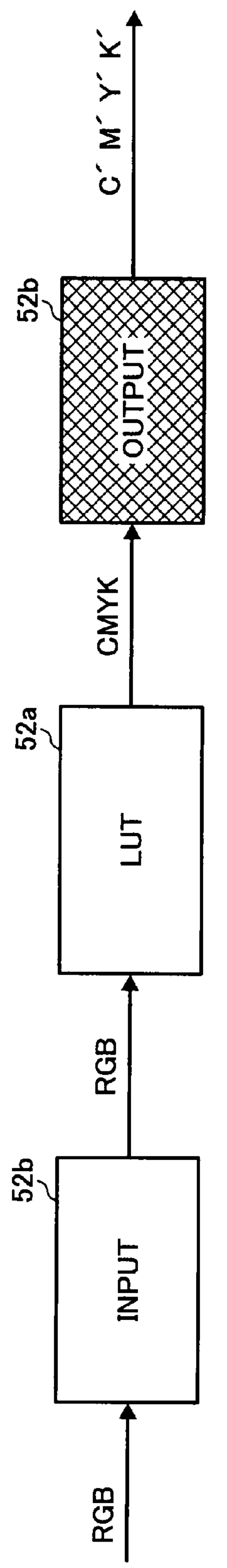
FIG. 8B is an illustration for explaining a correction method, performed by in the image forming apparatus shown in FIG. 1, according to an example embodiment of the present invention.

Referring to FIG. 8B, the second correction method mentioned above referring to FIG. 3G is explained. The second correction method corrects the color reproduction data stored in the output table 52*b*, which stores the density levels expressed in the CMYK color space. For example, referring to FIG. 4B, in order to correct the sample A having the detected density level D2 for the target density level 25%, the CMYK density level that corresponds to the target density level 25%, which has the detected density level of D2, is corrected such that the difference value ΔD, which is the difference between the detected density level D2 and the target density level of 25%, becomes 0. Since the second correction method corrects the CMYK density level using an adjustment parameter obtained from the difference value ΔD without calculating the Lab density level, workload or time may decrease.

When using the second correction method, in alternative to correcting the CMYK density level stored in the output table 52*b*, an interpolation equation may be previously stored in any desired memory, such as the NVRAM 24 or the ROM 16, which converts the uncorrected CMYK density level to the corrected CMYK density level (shown as the "C'M'Y'K" in FIG. 8B). In another example, a LUT storing the CMYK density levels and the corrected CMYK density levels in a corresponding manner may be previously prepared for one or more difference values ΔD. In such case, more than one LUT may be prepared depending on a color separation method available for use. For example, one LUT may be prepared for the CMY density levels, while another LUT may be prepared for the K density levels.

In alternative to the first or second correction method, density of the colorant may be adjusted in various other ways. In one example, density of the colorant may be adjusted by correcting the gamma characteristics data, which may be alternatively referred to as the gradation reproduction data, stored in the gamma table 54 of FIG. 2. For example, referring to FIG. 4B, in order to correct the sample A having the detected density level D2 for the target density level 25%, the gamma characteristics data may be corrected such that the difference value ΔD, which is the difference between the detected density level D2 and the target density level of 25%, becomes 0.

Figure 9:
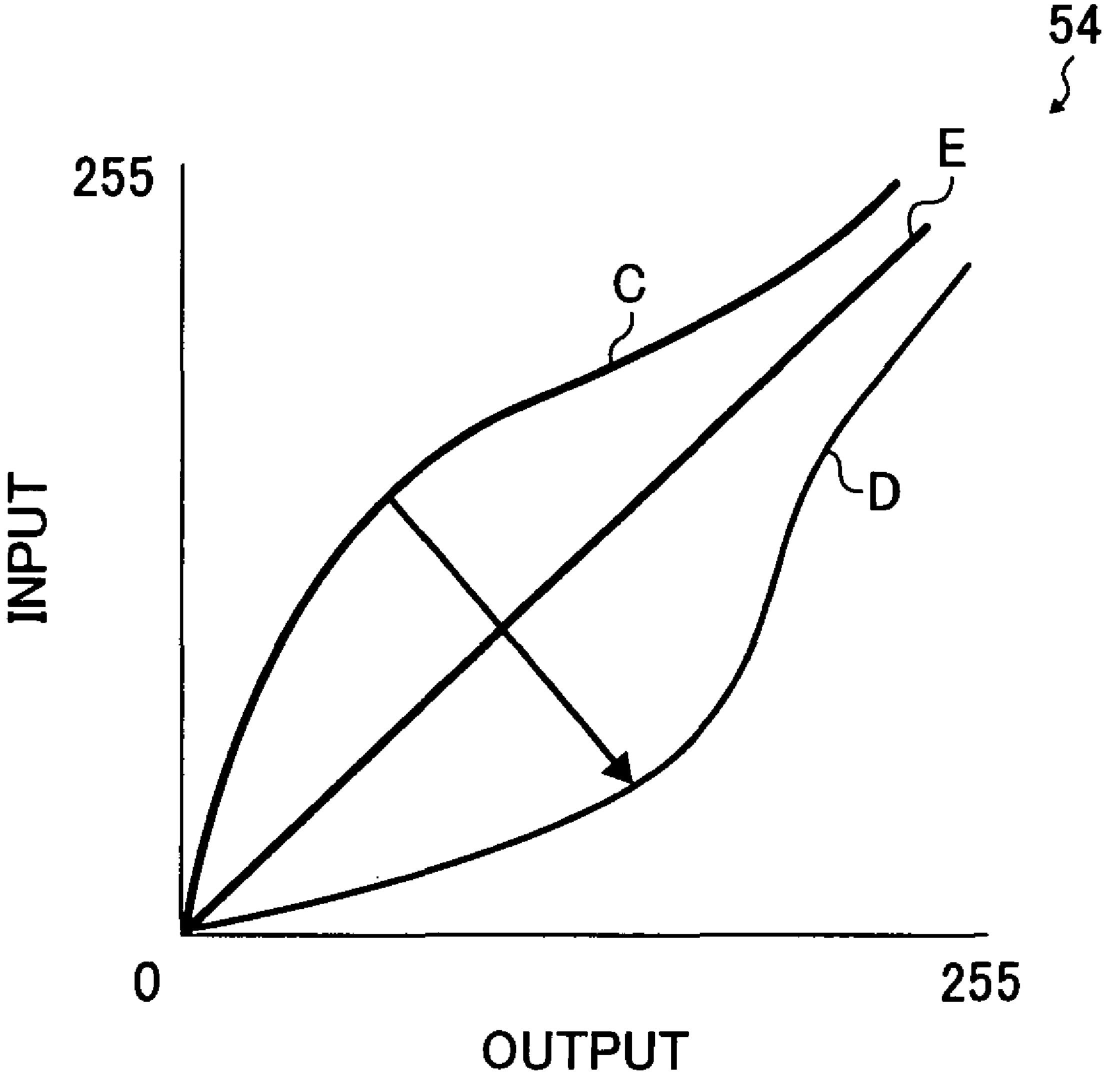
FIG. 9 is an illustration for explaining a correction method, performed by the image forming apparatus shown in FIG. 1, according to an example embodiment of the present invention.

The gamma characteristics data may be corrected, for example, by adjusting the gamma curve. Referring to FIG. 9, the gamma curve C corresponds to the gamma characteristics data before being corrected, and the gamma curve E corresponds to the target gamma characteristics data. In order to adjust the detected density level to be substantially equal to the target density level, a gamma curve D, which is symmetric to the curve C about the curve E, is obtained as the corrected gamma characteristics data. The curve D may indicate an adjustment parameter, which provides the density level of the curve E for a given difference value ΔD. In alternative to correcting the gamma characteristics data stored in the gamma table 54, a LUT storing the gamma characteristics data before being corrected and the corrected gamma characteristics data in a corresponding manner may be previously prepared and stored in any desired memory, such as the NVRAM 24. Further, in this example, the gamma characteristics data may be prepared for each one of the colors of the colorant. The correction method, which corrects the gamma characteristics data, may be selected when the high speed adjustment mode is selected.

In this example, any color reproduction data or gradation data may be corrected using a LUT, which provides an adjustment parameter for a given difference value ΔD. Alternatively, any color reproduction data or gradation data may be corrected using an adjustment parameter that causes the difference value ΔD to be 0, which may be obtained by the least square method.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

In another example, any one of the above-described and other methods of the present invention may be implemented by an image forming system. In one example, the image forming system may include a first information processing apparatus, a second information processing apparatus, and an image forming apparatus, which are connected via a network. The first information processing apparatus may be implemented by a general-purpose computer, which includes a processor and a memory. The second information processing apparatus may be implemented by a user interface device provided with the function of interacting with the user. Referring back to FIG. 1, any one of the functions performed by the detector 30 and the image forming engine 28 may be performed by the image forming apparatus. Any one of the functions performed by the controller 12 may be performed by the first information processing apparatus. Any one of the functions performed by the operation panel 20 may be performed by the second information processing apparatus.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image forming apparatus, comprising:

a storage configured to store a plurality of adjustment condition data sets;

an image forming engine configured to form a test pattern image of a test pattern using a colorant provided in the image forming apparatus;

a detector configured to detect a density level of the colorant from the test pattern image to output a detected density;

a controller configured to select one of the plurality of adjustment condition data sets as a selected adjustment condition data set, and perform density adjustment according to the selected adjustment condition data set; and a user interface controller configured to receive a user input selecting an adjustment mode or an image forming mode, wherein the selected adjustment condition data set is selected in a corresponding manner with the adjustment mode or the image forming mode.

2. The apparatus of claim 1, wherein the test pattern image comprises a halftone test pattern image including a plurality of sections each corresponding to a specific density level of the colorant, the specific density level being determined according to the selected adjustment condition data set.

3. The apparatus of claim 2, wherein the selected adjustment condition data set comprises:

condition data specifying an acceptable density range, and wherein the controller is configured to adjust density of the colorant using an adjustment parameter obtained from the detected density when the detected density is determined to fall outside the acceptable density range.

4. The apparatus of claim 3, wherein the selected adjustment condition data set further comprises at least one of:

condition data specifying time for performing density adjustment;

condition data specifying a number or a type of the test pattern from which the test pattern image is generated;

condition data specifying a maximum number of density adjustment to be performed by the controller; and condition data specifying an adjustment method to be performed by the controller.

5. A method of adjusting density of a colorant provided in an image forming apparatus, the method comprising:

determining whether to generate a test pattern according to condition data specifying time for performing density adjustment;

generating a test pattern according to condition data specifying a number or a type of the test pattern when the determining determines to generate the test pattern;

forming a test pattern image of the test pattern using the colorant of the image forming apparatus when the determining step determines to generate the test pattern;

obtaining a density level of the colorant from the test pattern image as a detected density; and adjusting the density of the colorant to have an adjusted density level using an adjustment parameter obtained from the detected density when the detected density falls outside an acceptable density range determined by condition data specifying the acceptable density range, wherein the colorant comprises a plurality of colors, and wherein the adjusting comprises:

determining whether to adjust the density of the colorant independently for each one of the plurality of colors according to condition data specifying a color separation method.

6. The method of claim 5, wherein the adjusting further comprises:

determining whether to adjust the density of the colorant for all samples of the detected density according to a status of all sample adjustment data stored as condition data specifying whether to adjust all samples of the detected density.

7. The method of claim 6, wherein the adjusting further comprises:

selecting a type of data to be corrected so as to adjust the density of the colorant according to condition data specifying a correction method.

8. The method of claim 7, further comprising:

determining whether the adjusted density level falls within the acceptable density range determined by the condition data specifying the acceptable density range; and determining whether to further adjust the density of the colorant having the adjusted density level according to condition data specifying a maximum number of density adjustment to be performed when the adjusted density level falls outside the acceptable density range.

9. The method of claim 8, further comprising:

sending notification when the adjusted density level falls outside the acceptable density range and when a current number of density adjustment is equal to or greater than the maximum number of density adjustment to be performed.

10. The method of claim 8, further comprising:

changing the density of the colorant from the adjusted density level back to a density level before being adjusted when the adjusted density level falls outside the acceptable density range and when the current number of density adjustment is equal to or greater than the maximum number of density adjustment to be performed.

11. The method of claim 8, further comprising:

receiving a user input selecting an adjustment mode or an image forming mode, wherein at least one of the condition data is selected in a corresponding manner with the adjustment mode or the image forming mode.

12. An image forming apparatus, comprising:

means for storing a plurality of adjustment condition data sets;

means for generating a test pattern;

means for forming a test pattern image of the test pattern using a colorant provided in the image forming apparatus;

means for detecting a density level of the colorant from the test pattern image to output a detected density;

means for selecting one of the plurality of adjustment condition data sets as a selected adjustment condition data set, and performing density adjustment according to the selected adjustment condition data set; and means for receiving a user input selecting an adjustment mode or an image forming mode, wherein the selected adjustment condition data set is selected in a corresponding manner with the adjustment mode or the image forming mode.

13. A nontransitory computer readable recording medium including a plurality of computer program instructions, which cause a computer to execute a density adjustment method, the method comprising:

determining whether to generate a test pattern according to condition data specifying time for performing density adjustment;

generating a test pattern according to condition data specifying a number or a type of the test pattern when the determining determines to generate the test pattern;

forming a test pattern image of the test pattern using the colorant of the image forming apparatus when the determining determines to generate the test pattern;

obtaining a density level of the colorant from the test pattern image as a detected density; and adjusting the density of the colorant to have an adjusted density level using an adjustment parameter obtained from the detected density when the detected density falls outside an acceptable density range determined by condition data specifying the acceptable density range, wherein the colorant comprises a plurality of colors, and wherein the adjusting comprises:

determining whether to adjust the density of the colorant independently for each one of the plurality of colors according to condition data specifying a color separation method.

* * * * *